Feb. 25, 1936.  R. B. SMITH  2,031,743
GLASS BEVELING MACHINE
Filed March 27, 1934   2 Sheets-Sheet 1
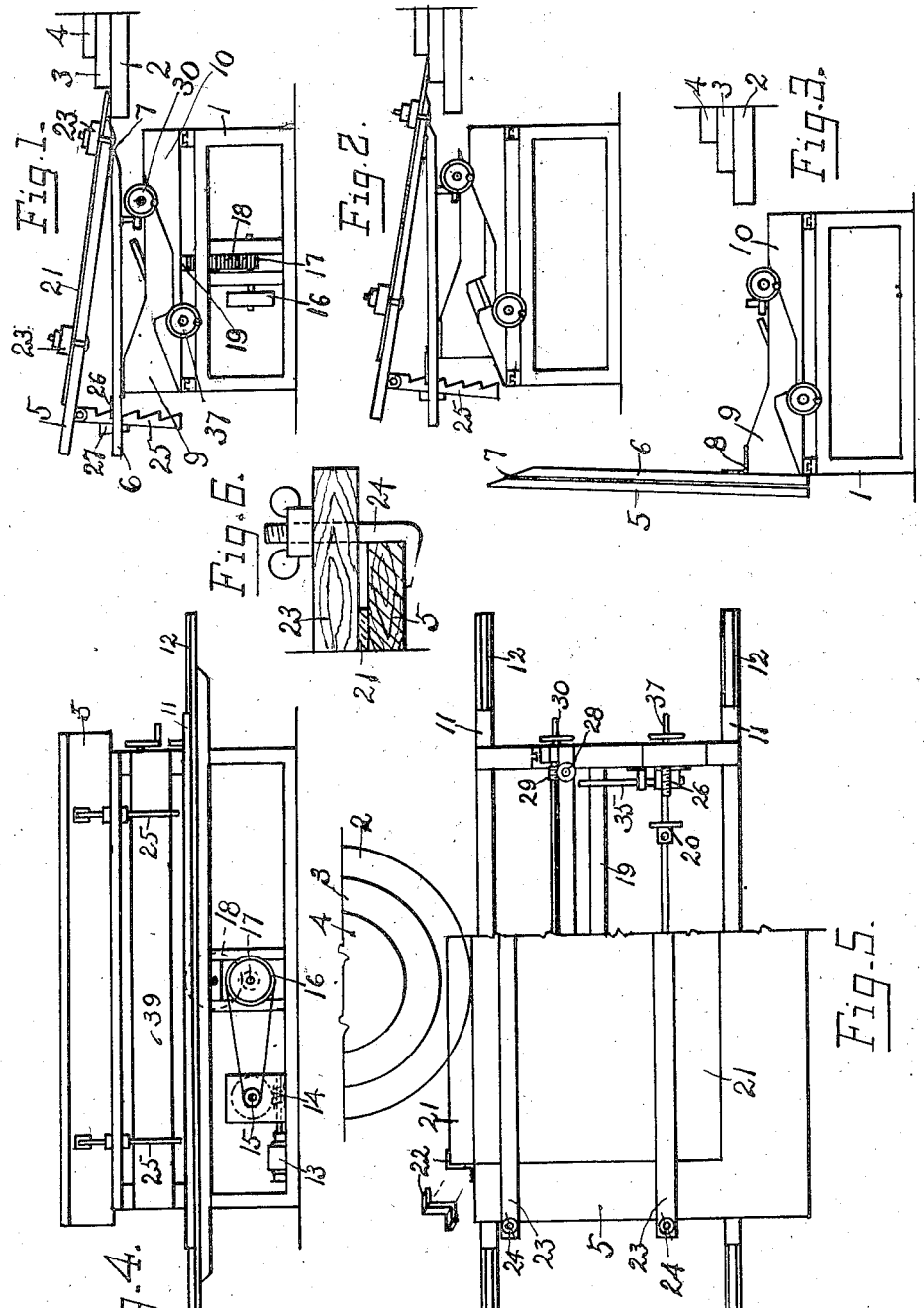
Inventor,
Ray B. Smith.
By
Geo. W. Bullard, Attorney.

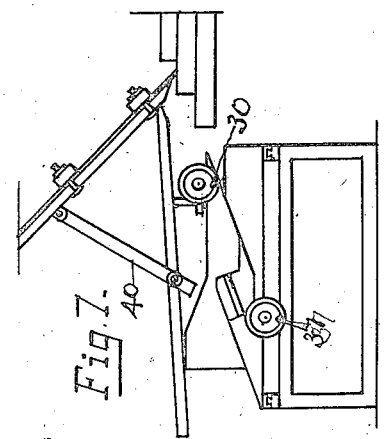
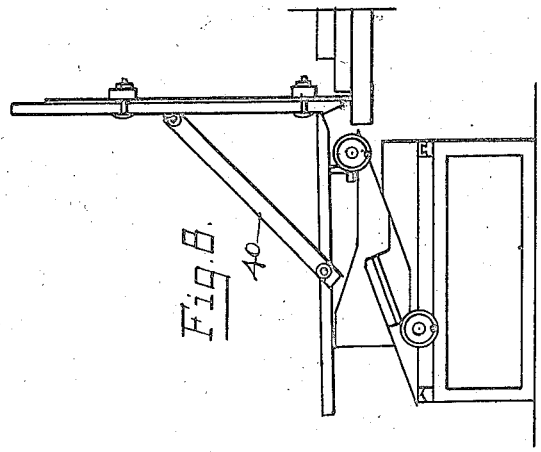
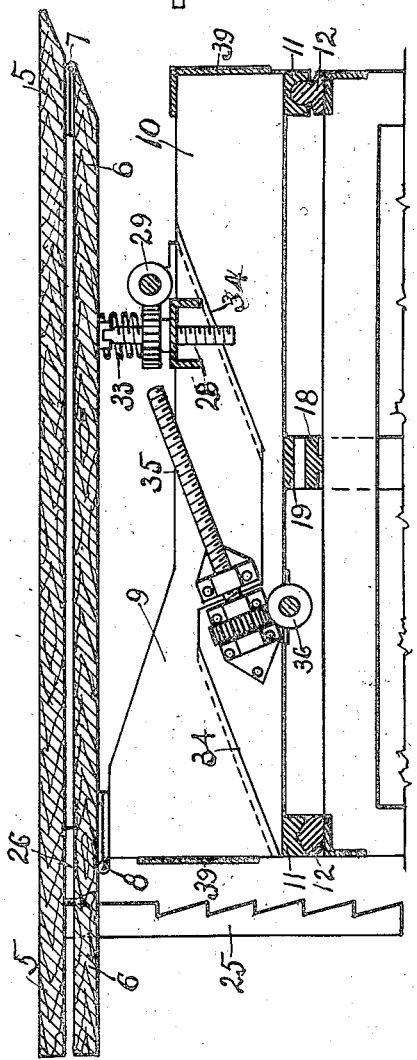

Patented Feb. 25, 1936

2,031,743

UNITED STATES PATENT OFFICE 2,031,743

GLASS BEVELING MACHINE

Ray B. Smith, Tacoma, Wash.

Application March 27, 1934, Serial No. 717,582

5 Claims. (Cl. 51—122)

This invention pertains to machines that are designed and used for beveling and mitering plate glass for commercial purposes, such glass as is generally used for mirrors, glass panels, in show cases and in show windows where an artistic and pleasing effect is desired.

The main object of the invention is to provide an improvement or improvements in glass beveling machines on which a plate of glass can be so positioned and secured and operated that any desired width of bevel will be ground to a uniform width and the grinding be automatically stopped when the desired width of bevel is ground.

A further object of the invention is to provide a series of grinding wheels or plates, one pyramided above the other, to be used in combination with the improved beveling machine for grinding the different grades from the first coarse grinding wheel to the second wheel of finer grade, and finally to the third or finest grinding wheel to finish the bevel preparatory for finishing on the buffing and polishing wheels.

A still further object of the invention is to provide a reciprocating table for grinding bevels, that can be raised back from the grinding wheels to a vertical position to receive a plate of glass to be ground and, after being secured in place, the table top can be turned down and raised and set at any angle desired with the grinding wheels for grinding different widths of bevels, and any angle of miters and for grinding square edges.

I attain these and other objects by means of the mechanism shown in the accompanying drawings, in which the general construction is shown in miniature with the novel operative parts shown and indicated in larger detail.

Figure 1 shows an end view of the grinding machine set beside the grinding wheels with the glass plate resting on the first coarse grinding wheel preparatory to grind the rough bevel; Fig. 2 is a similar view with the glass raised to the second grinding wheel where the rough bevel is being ground to a finer surface; Fig. 3 shows the machine with the table top turned back to a vertical position for receiving a plate of glass; Fig. 4 is a left side view of Fig. 1 with the power operating mechanism indicated; Fig. 5 is a top view of Fig. 4 with part of the table top omitted to admit a view of operative parts; Fig. 6 is an enlarged detail of a clamping device; Fig. 7 shows the machine with the table top set at an angle for grinding a miter edge; Fig. 8 is a similar view with the table top set for grinding a square edge; Fig. 9 is a cross section of the reciprocating table and novel operative parts from the line 9—9 of Fig. 10 so enlarged as to show the operation; Fig. 10 is a top view of Fig. 9 from the under side of the table top; Fig. 11 indicates the edge of a plate of glass set on the first grinding wheel preparatory to grinding the bevel; and Fig. 12 shows the set screw set to automatically stop the grinding when the width of bevel is completed.

In describing the invention, similar characters will be used to indicate similar parts of the several views.

Referring to the drawings, it will be seen that the novel operative machine is mounted on a rigid rectangular frame 1 made of angle irons or of cast iron as may be found most suitable.

This frame 1 is to be placed beside a group of three grinding wheels or plates 2, 3, and 4 pyramided one above the other as shown to be revolved in unison on a vertical shaft. The lower wheel 2 carries the coarse cutting grit by which the glass is ground to the desired bevel. The second wheel 3 carries a finer grit for smoothing the face of the roughly ground bevel, and the third wheel 4 carries a fine finishing grit by which the bevel is smoothly finished preparatory for the buffing and polishing machine.

The plate or plates of glass to be beveled are operated in contact with the grinding wheels 2, 3, and 4 by means of a reciprocating table top 5, one side of which is hinged to a sub-table top 6 as shown at 7. The opposite side of this sub-table top 6 is hinged at 8 to a pair of carriage bolsters composed of an upper member 9 supported on a lower member 10. The lower bolster members 10 are mounted on the rigid frame 1 by means of carriage rails 11 and 12 so grooved or dovetailed, one into the other, as to hold and carry the table tops on a perfect level beside the grinding wheels 2, 3, and 4, all of which is shown most plainly in Fig. 9.

The table tops and their carrying bolsters above described, are designed to be operated forth and back alongside the grinding wheels any means of power mechanism common to such devices. In Figs. 1 and 4 is indicated how the machine can be operated with an electric motor 13. The shaft of this motor operates a worm or spiral gear 14 from the shaft of which a small pulley with belt 15 drives a larger pulley 16 which is mounted on the shaft of a small gear pinion 17. This gear pinion engages and operates a larger gear wheel indicated at 18 which in turn engages and operates a rack 19, extending the full length of the machine and fixed to the lower side of each lower bolster member 10.

The motor to be used in this machine is to be a reversible motor with a reversible trip switch suitably located to be tripped by an adjustable trip 20 at or near each end of the machine and that can be adjusted to operate the machine for grinding any size of glass plate.

It is to be observed that other methods of power application may be used, such as reverse clutches, reverse belts and the like, but it is believed a reversible electric motor will prove to be the most suitable. By applying the power as indicated, it will be seen that the power of the motor is amplified and the necessary slow reciprocating movement of the machine is attained.

The novel construction and operation of the newly invented improvements will now be briefly described. A plate of glass 21 is placed on the table top 5 with its edge extended an even distance beyond the edge of the table top and over the first grinding wheel 2. This even distance is attained by a suitable gage shown at 22, Fig. 5. Different sizes of this gage are to be made to set the projection desired. After thus placing the glass, clamping bars 23 are securely set by means of L-shaped threaded bolts 24 in each end. The opposite side of the table top 5 is then raised and set at an angle to grind the exact width of bevel desired by means of ratchet supports 25, the ratchet notches being so spaced that each will position the glass plate to grind a certain width of bevel. A small metal plate 26 forms a secure seat for the ratchets and a small wedge 27 holds each thereon. While the glass was thus being placed the table top 5 was held up to keep the edge of the glass clear of the grinding wheel 2 by a pair of supporting and adjusting screws 28, one at each end of the machine and are operated by spiral gears on a common shaft and a crank wheel 30.

The table tops with the glass plate thereon are now to be lowered by means of the screws 28 until the edge of the glass plate 21 contacts the grinding wheel 2 as shown in Fig. 11. The points of the screws 28 have their ends squared and engaged between two downwardly extended lugs 31 of a metal plate 32, the spiral gear being threaded to raise and lower the screw 28. By a fixed number of turns of the spiral gear 29, the screws 28 are lowered to a point as indicated by the broken line in Fig. 12. The machine and the grinding wheels are now to be put in operation and the glass is ground until the broken line shown in Fig. 11 is reached and the metal plate 32 with the table tops thereon will have come to rest on the point of the screw 28. The grinding will now automatically cease when the desired width of bevel has been ground and the work has been done with accuracy.

It will be observed that the combined weight of the table tops and the plate of glass provide the pressure on the grinding wheels for grinding. It may be at times that this weight will be more than a thin sheet of glass will stand without breaking. To meet this condition, a light coil spring 33 is provided to encircle the screw supports 28, the spring being only of sufficient strength to partially bear the weight on the glass and thus prevent breaking.

The required bevel now being roughly ground, the machine and wheels are to be stopped and the glass is to be shifted to the second wheel 3 for a smoother grinding. This is done by shifting the upper members 9 of the carrying bolsters. It will be seen that the upper members 9 are operatively supported on their lower members 10 on equally inclined bearings 34. A threaded screw 35 with workable mountings and set parallel with the inclined bearings 34 is fixed on the inner sides of these bolsters and is designed to push the upper member 9 up the inclined bearings 34 and thus lift the table tops until the plate of glass thereon is clear of the second grinding wheel 3 as shown in Fig. 2, where it is lowered thereon to be ground from a rough to a smoother surface. It will be seen that each screw 35 is operated by a spiral gear 36, each gear being mounted on a shaft extending the full length of the machine and operated by means of a crank wheel 37.

After the second grinding is completed, the operation is repeated by screwing the upper member 9 up to the third wheel 4 for the final smooth grinding of the bevel. This being done the bevel is completed ready for the buffing and polishing wheels.

It should be observed that the screw threads of screws 35 may be made with a sharper incline with a view of imparting a faster movement to the upper bolster members 9.

The bolster members 9 and 10 are designed to be dovetailed together on their inclined bearings 34 to hold them in operative unison. Each member is held in an upright rigid position by web plates 39 fixed on their outer ends and extending and connecting each corresponding member at the opposite ends of the machine.

The foregoing description briefly sets forth the construction and operation of the invention which is believed to attain the objects set forth by a new and novel combination of mechanism.

It is to be observed that the invention is to be constructed in accord with the most modern shop practice without the showing herein of the exact details, and without confining myself to exact sizes and proportions. The size and proportion of any or all parts can be varied to work plates of glass of any size desired to be ground, and as any condition may require.

Referring to Fig. 3 it will be seen how the table tops are to be set up to receive a large plate of glass which can be handled singly only on edge. Fig. 2 indicates how the table tops are to be set for the grinding of short bevels and miters on the edge of a plate of glass, and Fig. 8 indicates how the table tops are to be set for the grinding of a square smooth edge on a plate of glass. In each of these two cases, a special brace 40 will have to be used. There can be a number of these braces made of various lengths for grinding any desired angle or miter. By referring to Fig. 4, it will be seen that the table top 5 extends a few inches over the sub-table top 6 which will permit this form of brace to be used. This manner of using bracing stays is common in all industries.

When grinding the end of a long plate of glass, the over projection of the plate at the rear side of the table top may at times form a counterbalance that will lift the grinding edge off the grinding plates. To prevent this uptip, the lugs 31 are bored with holes to receive a pin 41, the top of the screw 28 having an oblong opening therethrough to receive the pin. This will allow the screw to control the grinding of the plate as heretofore described and at the same time prevent the tipping of the table tops. The grinding edge can be held in contact with the grinding wheels by means of suitable weights placed thereon in the form of bags of sand or similar suitable weights.

It is to be observed that the glass carrying table top and the clamping bars thereon will be sur- Having described my invention, I claim:—

1. A glass beveling machine of the class described, comprising a reciprocating glass carrying table, carriage rails supporting said table on a rigid frame structure, power means for automatically imparting a reciprocating movement of said table on said carriage rails, a series of glass grinding wheels beside said reciprocating table, means for so adjusting said table laterally, that a plate of glass carried thereon will consecutively contact each of said grinding wheels operatively mounted beside said table, and said grinding wheels pyramided one above the other for consecutively grinding and finishing a bevel on the edge of a plate of glass carried on said reciprocating glass carrying table.

2. A glass beveling machine of the class described, comprising a reciprocating glass carrying table, said table operatively mounted and operated beside a series of grinding wheels mounted in pyramid form as described in claim 1, the glass carrying top of said table hinged to a sub-table top, ratchet and bracing means for supporting said glass carrying top in position for grinding bevels and smooth edges on a plate of glass secured on said table top, and said sub-table top so hinged to the carriage members of said table at its opposite side from the carrying top hinge, that said top when let down on said sub-table top, can be raised to vertical position with said sub-table top for receiving a plate of glass and securing the same to be ground thereon, as set forth and described.

3. A glass beveling machine of the class described, comprising a reciprocating glass carrying table, said table operatively mounted and operated beside a series of glass grinding wheels mounted in pyramid form as described in claim 1, said table having a glass carrying top, bar and bolt means for securing glass thereon, said top hinged at its side adjoining said grinding wheels to a sub-table top, said sub-table top hinged at its side opposite said grinding wheels to transverse carrying members of said table tops, said transverse members composed of an upper and a lower part, said upper part resting on dovetailed bearings on said lower part, and said bearings upwardly inclined toward said grinding wheels and with screw threaded means for adjusting said upper part and the table tops thereon laterally upward and over the said grinding wheels as described and for the purposes set forth.

4. In a glass beveling machine of the class described, a reciprocating glass carrying table, carriage rails supporting said table on a rigid frame structure, power means for operating said table on said carriage rails beside a series of glass grinding wheels operatively mounted in pyramid form beside said glass carrying table, said reciprocating glass carrying table comprising a pair of bolsters transversely mounted on the said carrying rails, each of said bolsters composed of a lower member with equally inclined bearings thereon, and an upper member adjustably mounted on said inclined bearings of the said lower member of said bolster, a sub-table top mounted on the said upper members of said bolsters, said sub-table top hinged to the ends of said upper members and opposite to the said grinding wheels, a glass carrying table top mounted on the said sub-table top and hinged thereto adjacent to the said grinding wheels, and ratchet supports at the opposite side of said table top, and said ratchets so spaced that the said table top will be held at a certain angle whereby a desired width of bevel will be ground on a plate of glass carried thereon when applied to the said series of glass grinding wheels.

5. In a glass beveling machine of the class described, a reciprocating glass carrying table, carriage rails supporting said table on a rigid frame structure, power means for operating said table on said carriage rails beside a series of glass grinding wheels operatively mounted in pyramid form beside said glass carrying table, said reciprocating glass carrying table comprising a pair of bolsters transversely mounted on the said carrying rails, each of said bolsters composed of a lower member with equally inclined bearings thereon, and an upper member adjustably mounted on said inclined bearings of the said lower member of said bolster, a sub-table top mounted on the said upper members of said bolsters, said sub-table top hinged to the ends of said upper members and opposite to the said grinding wheels, a glass carrying table top mounted on the said sub-table top and hinged thereto adjacent to the said grinding wheels, ratchet supports at the opposite side of said table top, said ratchets so spaced that the said table top will be held at a certain angle whereby a desired width of bevel will be ground on a plate of glass carried thereon when applied to the said series of glass grinding wheels, and adjustable screw threaded standards under the ends of said sub-table top to support the same and stop the grinding when the desired width of bevel has been ground.

RAY B. SMITH.